United States Patent
Pruetz

(10) Patent No.: US 9,500,481 B2
(45) Date of Patent: Nov. 22, 2016

(54) ROTATION RATE SENSOR AND METHOD FOR OPERATING A ROTATION RATE SENSOR

(71) Applicant: Robert Bosch GmbH, Stuttgart (DE)

(72) Inventor: Odd-Axel Pruetz, Nuertingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 294 days.

(21) Appl. No.: 14/313,330

(22) Filed: Jun. 24, 2014

(65) Prior Publication Data

US 2014/0373627 A1    Dec. 25, 2014

(30) Foreign Application Priority Data

Jun. 25, 2013 (DE) .................... 10 2013 212 056

(51) Int. Cl.
*G01C 19/5705* (2012.01)
*G01C 19/574* (2012.01)
*G01C 19/5712* (2012.01)

(52) U.S. Cl.
CPC ......... *G01C 19/574* (2013.01); *G01C 19/5712* (2013.01)

(58) Field of Classification Search
CPC ............ G01C 19/5712; G01C 19/574; G01C 19/5705
See application file for complete search history.

(56) References Cited

U.S. PATENT DOCUMENTS

| | | | |
|---|---|---|---|
| 6,927,568 B2 * | 8/2005 | Nozoe ................... | G01C 19/56 324/207.25 |
| 8,453,502 B2 * | 6/2013 | Meisel ............... | G01C 19/5747 73/504.04 |
| 2010/0037690 A1 * | 2/2010 | Gunthner ........... | G01C 19/5712 73/504.04 |
| 2010/0186505 A1 * | 7/2010 | Sattler ................ | G01C 19/5755 73/504.12 |

* cited by examiner

*Primary Examiner* — Francis Gray
(74) *Attorney, Agent, or Firm* — Norton Rose Fulbright US LLP

(57) ABSTRACT

A rotation rate sensor for detecting a rotation rate about a rotational axis parallel to a main extension plane of a substrate of the sensor includes: a first oscillating mass; and a second oscillating mass mechanically coupled to the first oscillating mass. The first oscillating mass is (i) deflectable along a first oscillations plane parallel to the main extension plane, (ii) extends in a planar manner parallel to the first oscillations plane in a rest position, and (iii) deflectable out of the first oscillations plane into a first deflection position. The second oscillating mass is (i) deflectable along a second oscillations plane parallel to the first oscillations plane, (ii) extends in a planar manner parallel to the second oscillations plane in a rest position, and (iii) deflectable out of the second oscillations plane into a second deflection position.

10 Claims, 6 Drawing Sheets

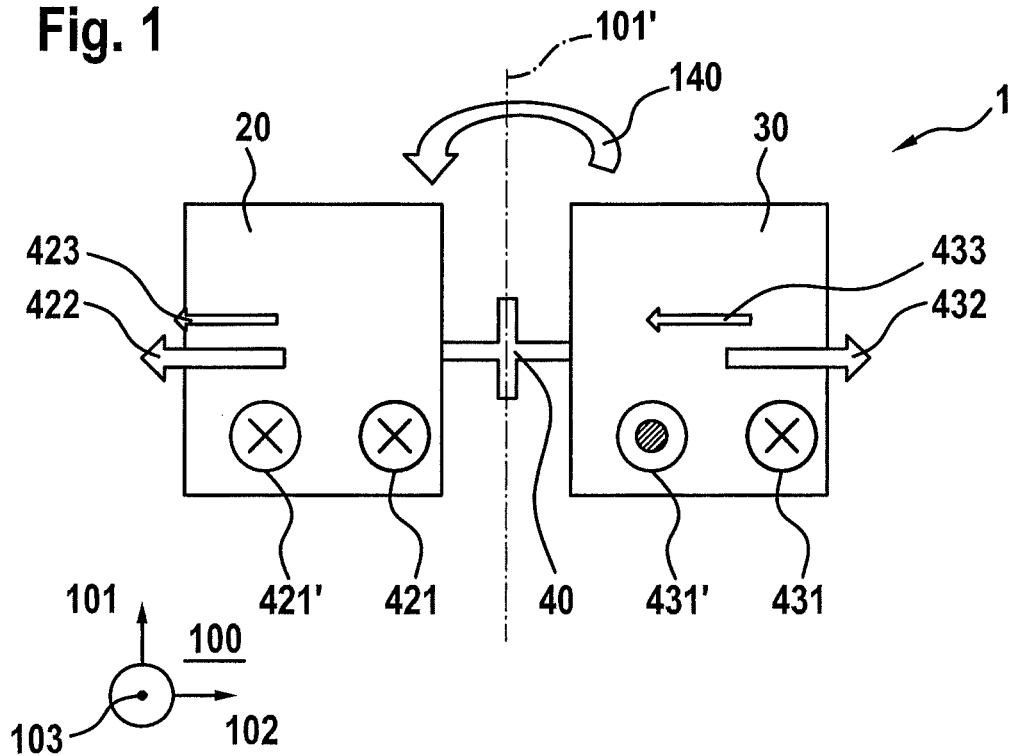
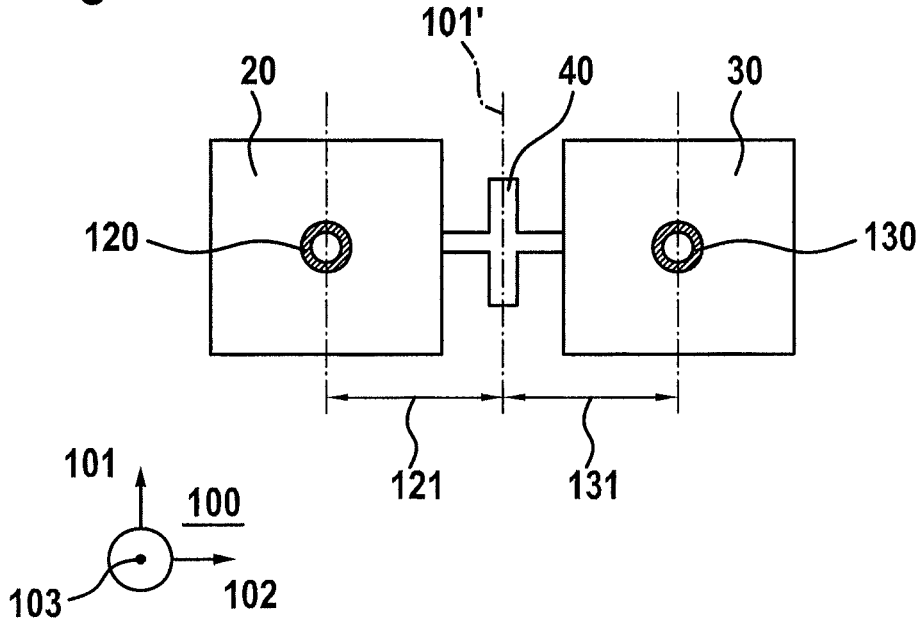

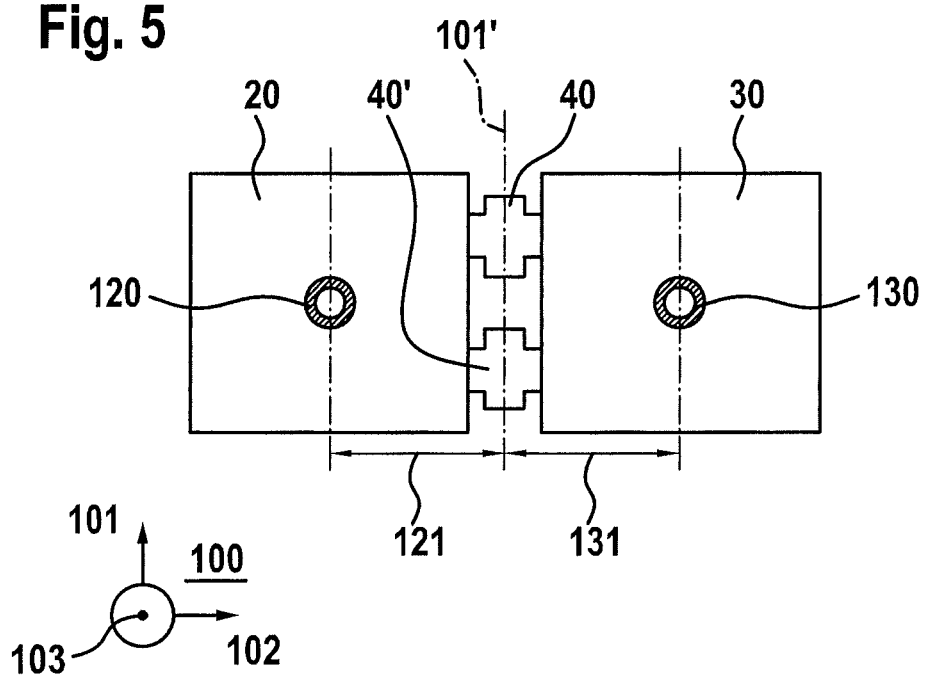
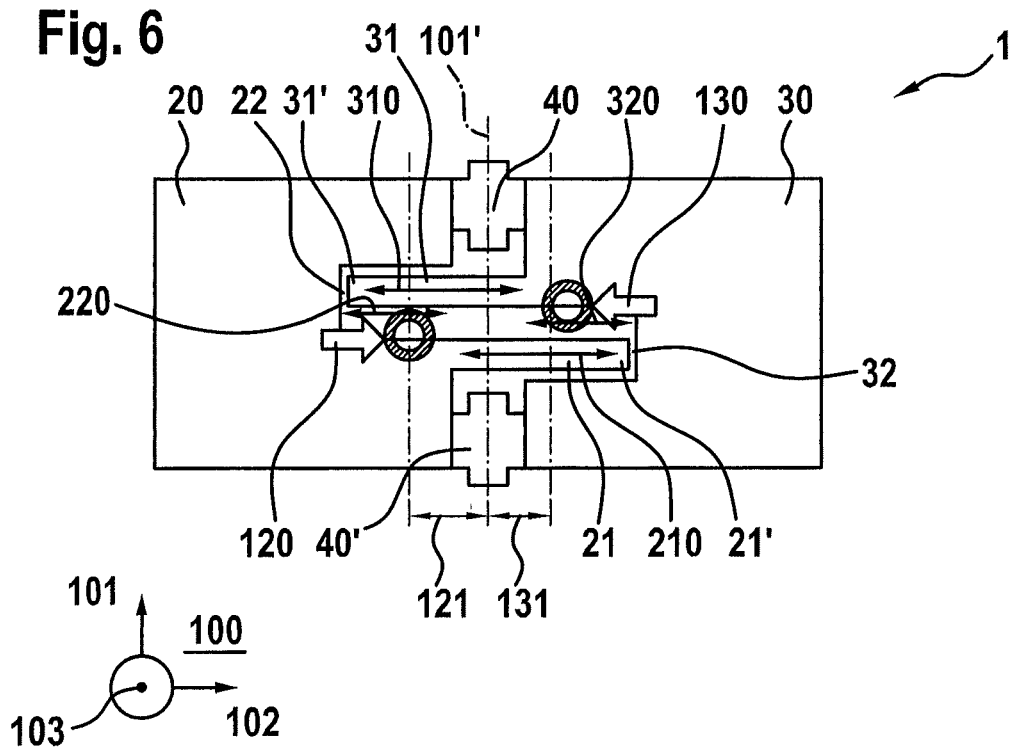

ROTATION RATE SENSOR AND METHOD FOR OPERATING A ROTATION RATE SENSOR

BACKGROUND OF THE INVENTION

1. Field of the Invention

The present invention is directed to a rotation rate sensor and to a method for operating a rotation rate.

2. Description of the Related Art

Such rotation rate sensors are generally known. For example, rotation rate sensors are known in which the rotation rate sensor is configured to detect a rotation rate about a rotational axis which is parallel to the main extension plane, the rotational axis being situated in parallel to an X-direction. Such a rotation rate sensor typically includes multiple oscillating masses—also referred to as sub-oscillators—which are joined to each other via a coupling structure. When the rotation rate sensor is subjected to a rotation rate about the rotational axis, a seismic mass of the rotation rate sensor which is driven to carry out a drive oscillation along a drive plane is deflected out of the drive plane into a detection direction due to the Coriolis effect. This deflection is detected in particular capacitively and referred to as a detection deflection, the associated oscillation being referred to as a detection oscillation. If the rotation rate sensor is additionally subjected to an interfering, temporally variable rotation rate or a so-called disturbance rotational acceleration, the seismic mass is deflected in the detection direction or driven to carry out a detection mode-like movement due to the mass inertia of the sub-oscillators. This detection deflection caused by the rotational acceleration is not distinguishable from the detection deflection caused by the Coriolis force in such known rotation rate sensors.

Multiple rotation rate sensors are usually coupled to each other and deflected in phase opposition with each other to distinguish a rotational acceleration from a rotation rate. However, one disadvantage of such coupled rotation rate sensors is that the existing complex structure of these rotation rate sensors has even higher complexity, and that a high spurious mode density is generated by the comparatively filigreed structure. This results in particular in a plurality of undesirable disturbing effects during operation. Another disadvantage of these rotation rate sensors is an increased space requirement, or a low useful capacity per area.

BRIEF SUMMARY OF THE INVENTION

It is therefore an object of the present invention to provide an improved rotation rate sensor and an improved method for operating a rotation rate sensor, the rotation rate sensor being less sensitive to rotational accelerations and having a sensor structure which is composed of fewer parts and has a comparatively simple design.

The rotation rate sensor according to the present invention and the method according to the present invention for operating a rotation rate sensor according to the other independent claims have the advantage over the related art that the centers of mass of the first oscillating mass and of the second oscillating mass are situated preferably close to each other, in particular on top of each other. One advantage over the related art is that the rotation rate sensor according to the present invention has a comparatively simple sensor structure including fewer components, and thus the number of excited spurious modes or the spurious mode density is reduced. Moreover, in particular a space advantage is achieved, or the space requirement is reduced, by an interlaced and/or interlocked arrangement of the first oscillating mass and of the second oscillating mass relative to each other.

In particular, the first oscillating mass is deflectable along the first oscillations plane which is essentially parallel to the main extension plane, which means that the first oscillating mass is driven to carry out a drive oscillation along the first oscillations plane, for example, or is excited to carry out a detection oscillation along the oscillations plane. For example, the drive oscillation along the first oscillations plane is a linear oscillation having a linear oscillating movement along an oscillation direction which is parallel to the drive plane, or a rotational oscillation having a rotational movement about a first drive axis which is essentially perpendicular to the oscillations plane. The detection oscillation along the oscillations plane here is a detection movement in parallel to the first oscillations plane, for example, caused by a Coriolis force. The same applies accordingly to the second oscillating mass, the second oscillating mass being driven to carry out the drive oscillation, or excited to carry out the detection oscillation, in phase or in phase opposition with the first oscillating mass.

In the case where the first oscillating mass and/or the second oscillating mass is/are driven along the first or second oscillations plane to carry out the drive oscillation,—when the rotation rate sensor is subjected to a rotation rate about the rotational axis—the first oscillating mass is deflected out of the first oscillations plane into a first deflection position due to a Coriolis force and/or the second oscillating mass is deflected out of the second oscillations plane into a second deflection position due to a Coriolis force. This deflection movement is also referred to as a detection movement or a detection oscillation and is in particular an opposite in phase or an in-phase linear movement or linear oscillation, or rotational movement or rotational oscillation, of the oscillating masses.

In the case where the first oscillating mass and/or the second oscillating mass is/are driven along the first or second oscillations plane to carry out the detection oscillation, the first oscillating mass and/or the second oscillating mass is/are driven to carry out a first or second drive movement along a Z-direction which is perpendicular to the main extension plane.

In particular, both the first oscillating mass and the second oscillating mass are in an equilibrium of forces in the rest position, in particular the first oscillating mass and the second oscillating mass being neither driven to carry out a drive oscillation nor deflected. This also means, for example, that the rotation rate sensor forms an inertial system, in particular no external force acting on the seismic mass and/or the rotation rate sensor.

The rotation rate sensor preferably includes a first functional layer situated on the substrate,
  either the first oscillating mass and the second oscillating mass in each case being formed only of the first functional layer, or
  the rotation rate sensor including a second functional layer, the first functional layer being situated between the substrate and the second functional layer, the first oscillating mass and the second oscillating mass both being formed of both the first functional layer and the second functional layer. According to the first alternative, the first oscillating mass and the second oscillating mass are situated in a shared oscillations plane in the rest position—i.e., during a manufacturing process only one functional layer is used to implement a seismic mass unit made of the first oscillating mass and second oscillating mass. According to the second alternative, the seismic mass unit, which includes the first oscillating mass and the second oscillating mass, is formed of at least two functional layers, i.e., the first oscillating mass and the second oscillating mass are situated in an overlapping manner or on top of each other along a projection direction which is perpendicular to the main extension plane—which here is also referred to as the Z-direction. A submass unit of the seismic mass unit is formed of the first functional layer, and a further submass unit of the seismic mass unit is formed of the second functional layer. The two submass units are in particular joined to each other with the aid of a connecting layer situated between the submass units. In particular, the submass unit includes a first oscillating submass of the first oscillating mass and a second oscillating submass of the second oscillating mass, and the further submass unit includes a further first oscillating submass of the first oscillating mass and a further second oscillating submass of the second oscillating mass. In particular, only the oscillating submasses of the particular oscillating mass are joined to each other via the connecting layer. In particular, the first submass unit has a layer height, and the further submass unit has a further layer height, the first layer height being essentially identical to the second layer height. Moreover, the first submass unit and the second submass unit have the same mass density. It is thus advantageously possible to keep mass asymmetries between the first oscillating mass and the second oscillating mass small.

The first oscillating mass preferably has multiple first protrusions and multiple first recesses, and the second oscillating mass has multiple second protrusions and multiple second recesses, in the rest position the first protrusions projecting into the second recesses and/or the second protrusions projecting into the first recesses.

According to one preferred refinement, it is provided that, in the rest position, the first oscillating mass and the second oscillating mass are situated offset next to each other along a projection direction which is perpendicular to the main extension plane in a shared oscillations plane, the first protrusion being situated outside the second recess in the first deflection position and/or the second protrusion being situated outside the first recess in the second deflection position; or that, in the rest position, the first oscillating mass and the second oscillating mass are situated on top of each other along the projection direction in different oscillations planes. It is thus advantageously possible that, according to the first alternative, in each case structures—i.e., a protrusion—of one oscillating mass project into an area—i.e., into the recess —of the other oscillating mass in order to thereby extend the mass distribution of the particular oscillating mass longitudinally—i.e., in the rest position, in a Y-direction which is essentially parallel to the main extension plane and perpendicular to the rotational axis. In this way, particularly advantageously a first center of gravity area of the first oscillating mass and/or a second center of gravity area of the second oscillating mass are moved toward each other compared to the related art—i.e., they are moved closer along the Y-direction. According to the present invention, the rotational acceleration sensitivity is thus particularly advantageously reduced. A center of gravity area here means in particular that the center of gravity of the particular oscillating mass is essentially situated in the center of gravity area, variances in the manufacturing process, for example, being able to affect the exact position of the center of gravity. According to the second alternative, it is advantageously possible for the two oscillating masses to become nested inside or interlocked with each other, utilizing at least two functional layers for the seismic mass here also referred to as three dimensionality or 3D MEMS—with the aid of the recesses or cut-outs and with the aid of additional masses—which are also referred to as islands—situated on the protrusions. This means, for example, that the additional mass of one oscillating mass is situated on a side facing the other oscillating mass in such a way that the additional mass projects in parallel to the Z-direction—i.e., from top to bottom, or from bottom to top, for example—into the recess of the other oscillating mass in each case.

According to one further preferred refinement, it is provided that the first oscillating mass and the second oscillating mass are designed in such a way that, in the rest position, a mass distribution and/or shape of the first oscillating mass, relative to a point of symmetry, is point-symmetrical with respect to a mass distribution and/or shape of the second oscillating mass, the point of symmetry in particular being situated on the rotational axis. It is thus advantageously possible that both oscillating masses project into each other and thus the space requirement is particularly efficiently reduced.

According to one further preferred refinement, it is provided that, in the rest position, the first recess of the first oscillating mass completely extends through the first oscillating mass along a projection direction which is perpendicular to the main extension plane and/or that, in the rest position, the second recess of the second oscillating mass completely extends through the second oscillating mass along the projection direction, in particular in the rest position the first recess being designed point-symmetrically with respect to the second recess, relative to the point of symmetry, in particular in the rest position a mass distribution and/or shape of the first protrusion being point-symmetrical with respect to a mass distribution and/or shape of the second protrusion, relative to the point of symmetry. It is thus advantageously possible for the distinction between Coriolis acceleration and disturbance accelerations to be improved even further due to the mass symmetry.

According to one further preferred refinement, it is provided that the first protrusion has a first main direction of extension and the second protrusion has a second main direction of extension, in the rest position the first main direction of extension and the second main direction of extension being situated in parallel to each other and to the main extension plane, the first protrusion and the second protrusion being situated next to each other offset from each other, or at least partially overlapping each other, along a projection direction which is perpendicular to the main extension plane. It is thus advantageously possible, in the rest position, to situate the first oscillating mass and the second oscillating mass either essentially in the same functional plane of a shared first functional layer or in an overlapping manner along the projection direction, the space requirement being comparatively small and, at the same time, the rotational acceleration sensitivity being at least partially or almost completely eliminated.

According to one further preferred refinement, it is provided that—in the rest position—the first protrusion is primarily surrounded by the second oscillating mass along a circumferential line extending in parallel to the main extension plane and/or that, in the rest position, the second protrusion is primarily surrounded by the first oscillating mass along a further circumferential line extending in parallel to the main extension plane. According to one further preferred refinement, it is provided that the first recess has a further first main direction of extension and/or the second recess has a further second main direction of extension, in the rest position the first main direction of extension of the first protrusion and the further second main direction of extension of the second recess being situated in parallel to each other and/or in the rest position the second main direction of extension of the second protrusion and the further first main direction of extension of the first recess being situated in parallel to each other. It is thus advantageously possible to situate the two oscillating masses relative to each other in such a way that the centers of gravity of the two oscillating masses are positioned essentially on top of each other, so that the rotational acceleration sensitivity is largely reduced, and to still provide a comparatively simple and space-saving rotation rate sensor.

According to one further preferred refinement, it is provided that the first oscillating mass is linearly deflectable along a first deflection direction which is perpendicular to the main direction of extension, the second oscillating mass being linearly deflectable along a second deflection direction which is parallel to the first deflection axis; or that the first oscillating mass is situated rotatably about a first oscillation axis which is essentially parallel to the main extension plane and essentially perpendicular to the rotational axis, the second oscillating mass being situated rotatably about a second oscillation axis which is parallel to the first oscillation axis. It is thus advantageously possible to situate the two oscillating masses relative to each other in such a way that the centers of gravity of the two oscillating masses are positioned essentially on top of each other, so that the rotational acceleration sensitivity is largely reduced, and still not only a comparatively simple and space-saving rotation rate sensor is provided, but also an opposite in phase deflection of the two oscillating masses with respect to each other is enabled.

According to one further preferred refinement, it is provided that the first protrusion of the first oscillating mass includes a first additional mass, the first additional mass and the first recess being situated along the first main direction of extension at opposing ends of the first protrusion and/or the first oscillating mass including a further first additional mass, the further first additional mass surrounding the first recess, in particular in a C-shaped manner. It is thus advantageously possible to reduce the space requirement even more by positioning additional masses and utilizing two functional layers for the oscillating masses since the oscillating masses are situated on top of each other and the rotational acceleration sensitivity is still reduced.

According to one further preferred refinement, it is provided that the second protrusion of the second oscillating mass includes a second additional mass and a further second additional mass, the first additional mass and/or the further first additional mass of the first oscillating mass and the second additional mass and/or the further second additional mass of the second oscillating mass being situated on mutually facing sides of the first and second oscillating masses. It is thus advantageously possible to reduce the space requirement even more by positioning additional masses and utilizing two functional layers for the oscillating masses since the oscillating masses are situated on top of each other, and the rotational acceleration sensitivity is still reduced and an opposite in phase deflection is possible.

According to one preferred refinement of the method according to the present invention, it is provided that, during the second method step, the first oscillating mass and the second oscillating mass are linearly moved out of the shared oscillations plane; or the first oscillating mass is rotated about the first oscillation axis and out of the first oscillations plane, the second oscillating mass being rotated about the second oscillation axis and out of the second oscillations plane. It is thus advantageously possible for the two oscillating masses to be deflected relative to each other and, at the same time, for the centers of gravity of the two oscillating masses to be essentially positioned on top of each other. The rotational acceleration sensitivity is thus largely reduced, and nonetheless a rotation rate sensor is provided which both has a comparatively simple design and is space-saving.

According to one further preferred refinement of the method according to the present invention, it is provided that the first oscillating mass is deflected out of the first oscillations plane and the second oscillating mass is deflected out of the second oscillations plane in phase opposition to each other. It is thus advantageously possible that detection signals caused by interfering accelerations are distinguishable even better from the rotation rate signal.

Exemplary embodiments of the present invention are shown in the drawings and are described in greater detail in the following description.

BRIEF DESCRIPTION OF THE DRAWINGS

FIGS. 1-4 show various views of a rotation rate sensor according to a first example embodiment of the present invention.

FIG. 5 shows another example embodiment of a rotation rate sensor according to the present invention.

FIG. 6 shows another example embodiment of a rotation rate sensor according to the present invention.

DETAILED DESCRIPTION OF THE INVENTION

Figure 3:
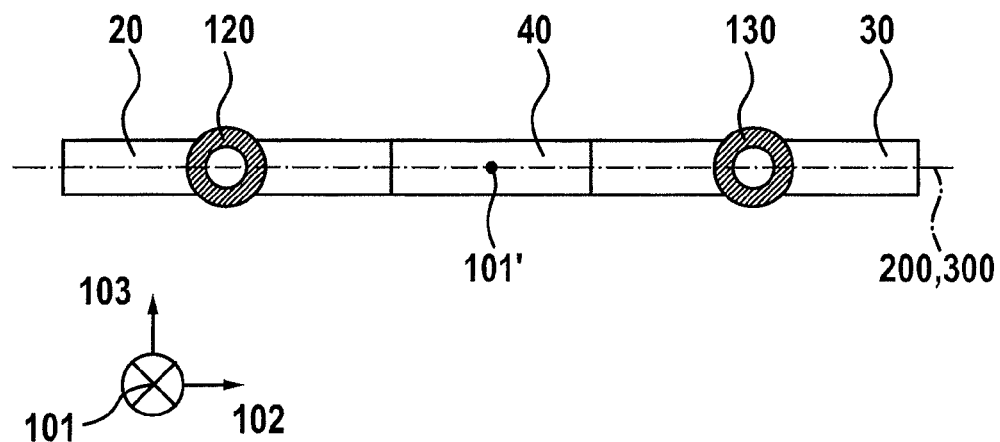

Identical parts are always denoted by the same reference numerals in the various figures and are therefore generally also cited or mentioned only once.

FIG. 1 is a schematic illustration of a top view onto a rotation rate sensor 1 according to one specific embodiment of the present invention. The rotation rate sensor includes a first oscillating mass 20 and a second oscillating mass 30 coupled to the first oscillating mass via a coupling element

40. The two oscillating masses 20, 30 here extend essentially in parallel to main extension plane 100 of substrate 10 (shown in FIG. 7, for example). Here, a rotational axis 101' is situated in parallel to an X-direction 101 in parallel to the main extension plane 100. In particular, the two oscillating masses 20, 30 here are situated mirror symmetrically with regard to a reflection on rotational axis 101'.

Here, rotation rate sensor 1 is subjected to a rotation rate (see arrow 140), while first and second oscillating masses 20, 30 are driven in phase opposition (indicated by arrows 422, 432) or in phase (indicated by arrows 423, 433) to carry out a drive oscillation, i.e., oscillating masses 20, 30 here are deflected along a Y-direction 102 which is essentially perpendicular to X-direction 101 and parallel to main extension plane 100 or along a shared oscillations plane 300, 400 (see FIG. 3). This causes a deflection movement—i.e., here a detection movement due to a Coriolis force—of the two oscillating masses 20, 30 along a Z-direction 103 which is perpendicular to main extension plane 100 or out of oscillations plane 300, 400. For example, here both an in-phase detection movement is indicated by reference numerals 421, 431 and an opposite in phase detection movement is indicated by reference numerals 421', 431'.

FIG. 2 additionally shows first center of gravity area 120 of the first oscillating mass and second center of gravity area 130 of the second oscillating mass, while rotation rate sensor 1 here in particular is in the rest position. First center of gravity distance 121 between first center of gravity area 120 and rotational axis 101' here is essentially identical to second center of gravity distance 131 between second center of gravity area 130 and rotational axis 101'. First and second center of gravity distances 121, 131 are ascertained in particular in each case along a direction perpendicular to rotational axis 101'—here, along Y-direction 102.

Figure 4:
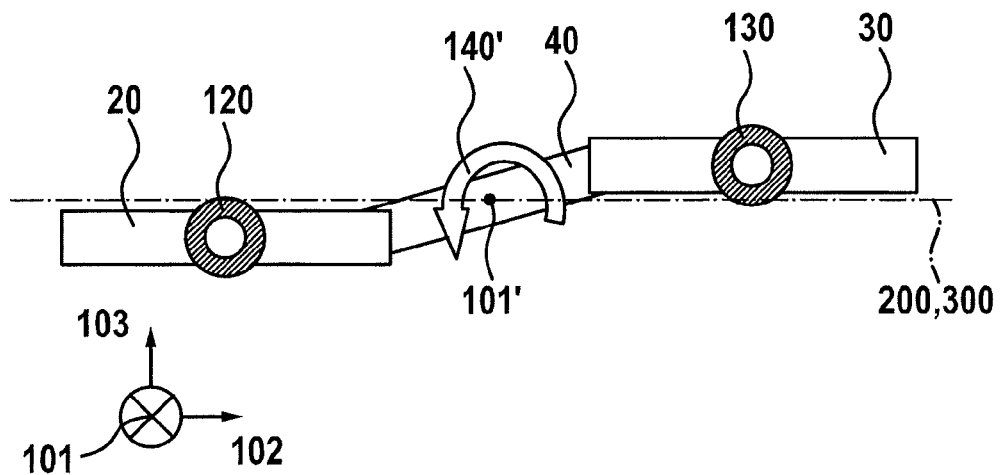

FIG. 3 shows a side view of rotation rate sensor 1. Here, the rotation rate sensor is shown in the rest position or in a position in which first and second oscillating masses 30, 40 both extend essentially along the shared oscillations plane 200, 300. Oscillations plane 200, 300 here is a functional plane 200, 300 which is formed of a first functional layer (100') and is situated essentially in parallel to main extension plane 100. FIG. 4 shows first oscillating mass 30 in a first deflection position, and second oscillating mass 40 in a second deflection position. Here, the two oscillating masses 30, 40 are deflected in opposite directions along the Z-direction, as is the case, for example, when rotation rate sensor 1 is subjected to a rotational acceleration (indicated by arrow 140') about rotational axis 101'. By reducing the distance between center of gravity areas 120, 130 and rotational axis 101', this deflection is reduced according to the present invention, while rotational acceleration 140' remains the same. The specific embodiment of rotation rate sensor 1 shown in FIG. 5 essentially corresponds to the specific embodiments shown in FIGS. 1 through 4, here first oscillating mass 30 being coupled to second oscillating mass 40 via a first coupling element 40 and a further coupling element 40'. In particular, according to the present invention first oscillating mass 30 is spring elastically coupled to second oscillating mass 40. In particular, according to the present invention coupling element 40 and/or further coupling element 40' is/are designed as a rocker structure.

FIG. 6 shows a rotation rate sensor 1 according to one specific embodiment of the present invention, here rotation rate sensor 1 being shown in particular in a rest position or in a position in which first and second oscillating masses 20, 30 are in a rest position. Here, first oscillating mass 20 and second oscillating mass 30 are formed in particular of the same functional layer, and in particular extend in a planar manner in parallel to a functional plane of the functional layer. In particular, the functional plane is situated here in parallel to main extension plane 100.

Here, first oscillating mass 20 is formed or situated in particular essentially point symmetrically with respect to second oscillating mass 30, the associated point of symmetry being situated in particular on rotational axis 101'. Here, first oscillating mass 20 has a first recess 22 and a first protrusion 21, and second oscillating mass 30 has a second recess 32 and a second protrusion 31. First protrusion 21 and second protrusion 31 here are designed in particular in a beam shape, first protrusion 21 having a main direction of extension 210 essentially in parallel to Y-direction 102, and second protrusion 31 having a main direction of extension 310 essentially in parallel to Y-direction 102. First protrusion 21 here projects along its main direction of extension 210 into second recess 32, here second recess 32 in particular having a further second main direction of extension 320, which is situated essentially in parallel to first main direction of extension 210 of first protrusion 21. A further first main direction of extension 310 is situated essentially in parallel to second main direction of extension 310 of second protrusion 31, second protrusion 31 projecting along its second main direction of extension 310 into further first main direction of extension 320. In this way—in particular compared to the specific embodiment shown in FIG. 5—a displacement of first center of gravity area 120 and of second center of gravity area 130 in parallel to Y-direction 102 toward each other or toward rotational axis 101' is implemented. In this way, according to the present invention first center of gravity distance 121 and second center of gravity distance 131 are advantageously reduced, so that rotation rate sensor 1 has a comparatively low rotational acceleration sensitivity. In particular, first and second oscillating masses 20, 30 are designed in such a way that center of gravity areas 120, 130 are situated on top of each other.

Moreover, in particular an end 21' of first protrusion 21 which faces away from first oscillating mass 20 is surrounded, in particular in a C-shaped manner, along a circumferential line extending in parallel to main extension plane 100 by an edge of second recess 32 of second oscillating mass 30. Moreover, here an end 31' of second protrusion 31 which faces away from second oscillating mass 30 is surrounded, in particular in a C-shaped manner, along a further circumferential line extending in parallel to main extension plane 100 by an edge of first recess 22 of first oscillating mass 20.

Figure 7:
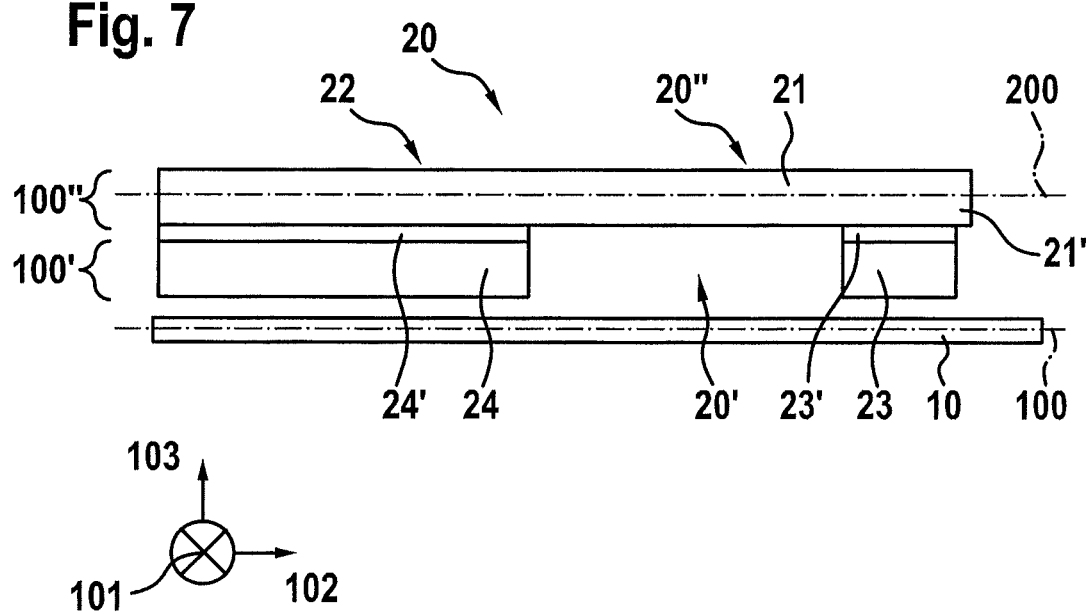
FIG. 7 shows a side view of a rotation rate sensor according to an example embodiment of the present invention.

FIG. 7 shows a side view of a rotation rate sensor 1 according to one specific embodiment of the present invention. Here, rotation rate sensor 1 includes a substrate 10 having a main extension plane 100, a first functional layer 100' applied thereto, and a second functional layer 100" applied to first functional layer 100', here a connecting layer 23', 24' being situated between first functional layer 100' and second functional layer 100" and joining first functional layer 100' to second functional layer 100".

Figure 8:
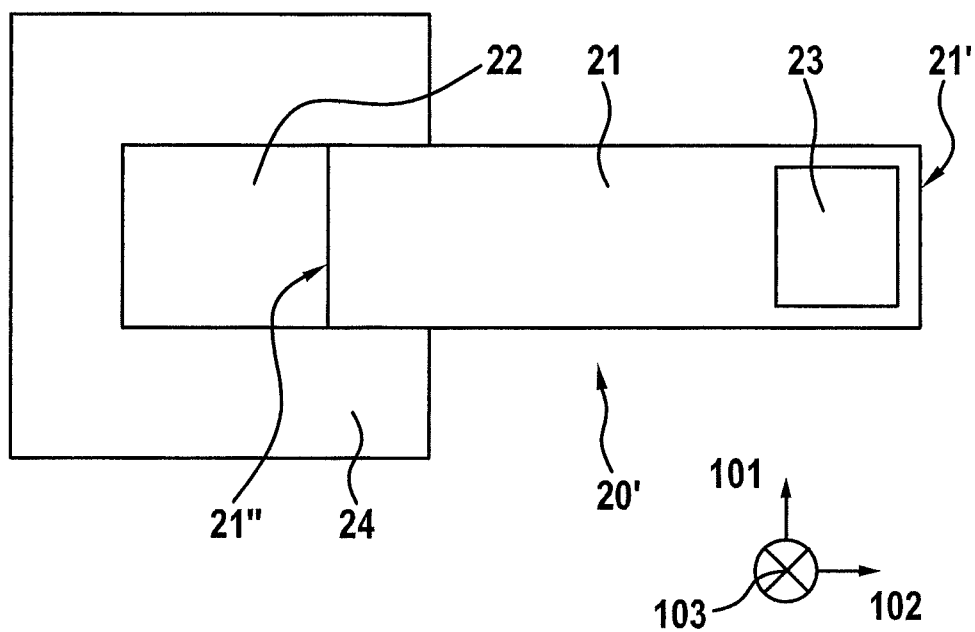
FIG. 8 shows a top view of one end of first oscillating mass facing second oscillating mass.
Figure 9:
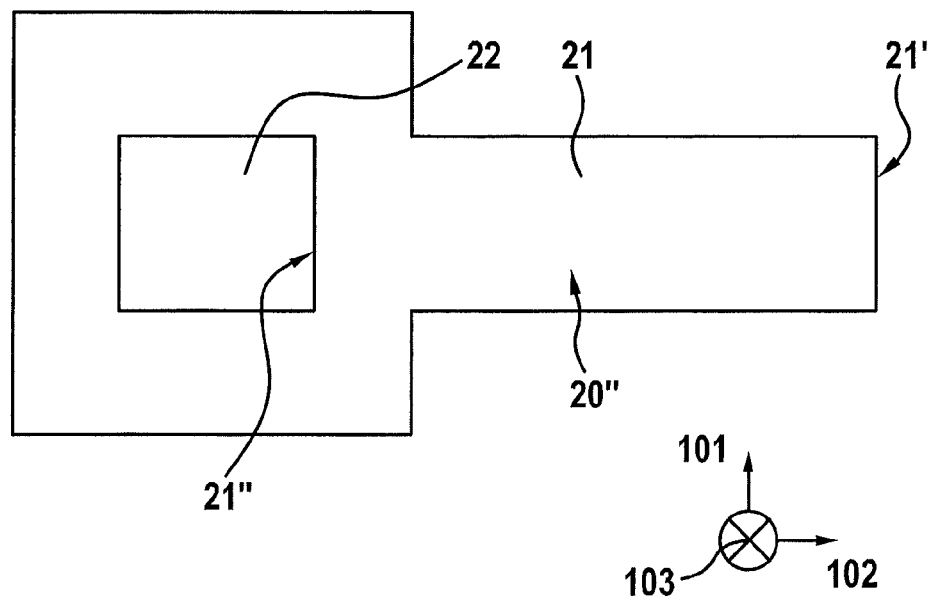
FIG. 9 shows a top view of one end of first oscillating mass facing away from second oscillating mass.

Here, first oscillating mass 20 is formed of first functional layer 100' and of second functional layer 100", first oscillating mass 20 here including a first additional mass unit 23, 24 formed of first functional layer 100', first additional mass unit 23, 24 including a first additional mass 23 and a further first additional mass 24. Moreover, first oscillating mass 20 includes a first submass formed of second functional layer 100", the first submass extending in a planar manner essentially in parallel to a second functional plane 200 of second functional layer 100". In the rest position, second functional plane 200 is essentially identical to first oscillations plane 200. Here, protrusion 21 includes first additional mass 23 at an end 21' situated opposite first recess 22. In particular, here a layer height of first layer 100' is essentially identical to a second layer height of second layer 100", the first and second layer heights extending along Z-direction 103. Moreover, first oscillating mass 20 includes a side 20' facing second oscillating mass 30 in the rest position and a side 20" facing away from side 20'. FIG. 8 shows a top view of first oscillating mass 20, here side 20' facing second oscillating mass 30 being shown in the top view. Here, additional mass 23 is situated at an end 21' of first protrusion 21, which is situated opposite end 21" along Y-direction 102 on which first recess 22 is situated. Here, further first additional mass 24 surrounds first recess 22 along a circumferential line, in particular in a C-shaped manner. FIG. 9 shows a top view of first oscillating mass 20, here end 20" facing away from second oscillating mass 30 being shown.

Figure 10:
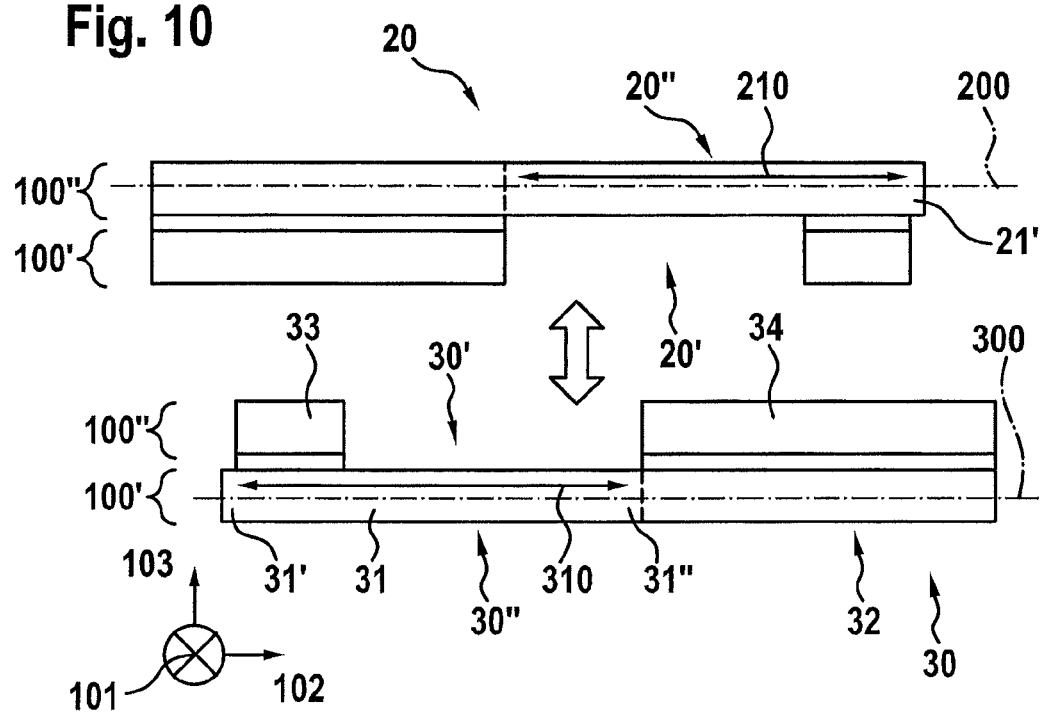
FIG. 10 shows an exploded view of first oscillating mass and second oscillating mass.

FIG. 10 shows an exploded view of first oscillating mass 20 and second oscillating mass 30. Here, first main direction of extension 210 of first protrusion 21 is situated in parallel to second main direction of extension 310 of second protrusion—i.e., first oscillating mass 20 and second oscillating mass 30 are in the rest position or in a non-deflected position.

Figure 11:
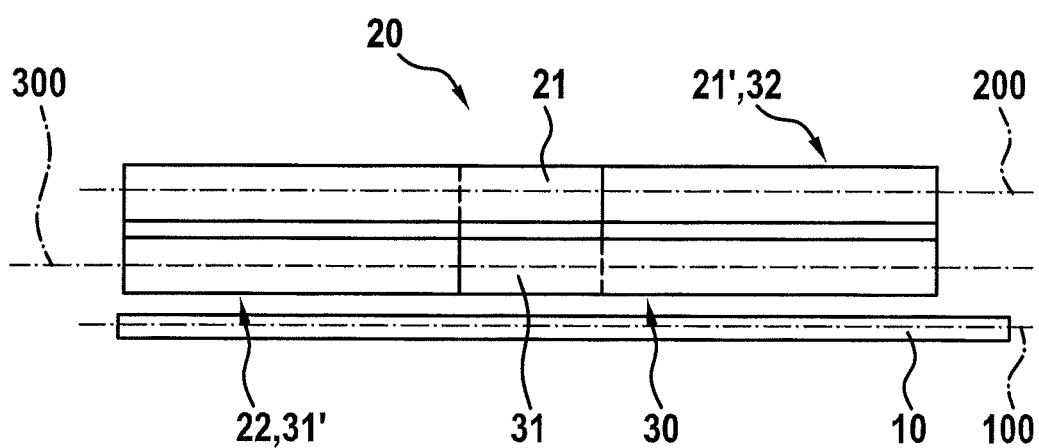
FIG. 11 shows first oscillating mass and second oscillating mass in the rest position.

Moreover, first additional mass 23 extends along the Z-direction into second recess 32 of the second oscillating mass, first protrusion 21 additionally projecting along main direction of extension 210 through a second opening of C-shaped further second additional mass 34 of second oscillating mass 30 into second recess 32. Accordingly, second additional mass 33 of second oscillating mass 30 projects along Z-direction 103 into first recess 22 of first oscillating mass 20, additionally second protrusion 31 of second additional mass 30 projecting along second main direction of extension 310 through a second opening of C-shaped further first additional mass 24 into first recess 22. Moreover, second additional mass 33 and further second additional mass 34 are situated on opposing ends 31', 31" of second oscillating mass 30 here as well. Here, in particular first oscillating mass 20 is formed and situated point symmetrically with respect to second oscillating mass 30. FIG. 11 shows first oscillating mass 20 and second oscillating mass 30 in the rest position, the first submass of the first oscillating mass being situated in second functional plane 200 of second functional layer 100", and first additional mass unit 23, 24 of the first oscillating mass being situated in first functional plane 300 of first functional layer 100'. The second submass of second oscillating mass 30 is situated here in first functional plane 300, and second additional mass unit 33, 34 of second oscillating mass 30 is situated in second functional plane 200. This means that first oscillating mass 20 and second oscillating mass 30 are nested inside each other or situated in an interlocked position. During a first deflection of first oscillating mass 20, in particular first protrusion 21 projects through second recess 32, and in a second deflection of second oscillating mass 30, in particular second protrusion 22 projects through first recess 22 into first oscillating mass 20.

What is claimed is:

1. A rotation rate sensor, comprising:
   a substrate having a main extension plane, wherein the rotation rate sensor is configured to detect a rotation rate about a rotational axis which is essentially parallel to the main extension plane;
   a first oscillating mass; and
   a second oscillating mass mechanically coupled to the first oscillating mass;
   wherein the first oscillating mass is configured to be (i) deflectable along a first oscillations plane which is essentially parallel to the main extension plane, (ii) in a rest position, extending in a planar manner essentially in parallel to the first oscillations plane, and (iii) deflectable out of the first oscillations plane into a first deflection position;
   wherein the second oscillating mass is configured to be (iv) deflectable along a second oscillations plane which is essentially parallel to the first oscillations plane, (v) in a rest position, extending in a planar manner essentially in parallel to the second oscillations plane, and (vi) deflectable out of the second oscillations plane into a second deflection position; and
   wherein the first oscillating mass and the second oscillating mass are situated in such a way as to be at least one of:
   (a) in the rest position, a first protrusion of the first oscillating mass projects into a second recess of the second oscillating mass;
   (b) in the rest position, a second protrusion of the second oscillating mass projects into a first recess of the first oscillating mass;
   (c) in the first deflection position, the first protrusion projects through the second recess; and
   (d) in the second deflection position, the second protrusion projects through the first recess.

2. The rotation rate sensor as recited in claim 1, wherein one of:
   (a) in the rest position, the first oscillating mass and the second oscillating mass are situated offset next to each other along a projection direction which is perpendicular to the main extension plane in a shared oscillations plane, and at least one of (i) the first protrusion being situated outside the second recess in the first deflection position, and (ii) the second protrusion being situated outside the first recess in the second deflection position; or
   (b) in the rest position, the first oscillating mass and the second oscillating mass are situated on top of each other along the projection direction in different oscillations planes.

3. The rotation rate sensor as recited in claim 1, wherein the first oscillating mass and the second oscillating mass are configured in such a way that, in the rest position, at least one of a mass distribution and shape of the first oscillating mass, relative to a point of symmetry, is point-symmetrical with respect to at least one of a mass distribution and shape of the second oscillating mass, and wherein the point of symmetry is situated on the rotational axis.

4. The rotation rate sensor as recited in claim 1, wherein at least one of:
   (a) in the rest position, the first recess of the first oscillating mass completely extends through the first oscillating mass along a projection direction which is perpendicular to the main extension plane; and
   (b) in the rest position, the second recess of the second oscillating mass completely extends through the second oscillating mass along the projection direction.

5. The rotation rate sensor as recited in claim 1, wherein:
   the first protrusion has a first main direction of extension;
   the second protrusion has a second main direction of extension; and
   in the rest position the first main direction of extension and the second main direction of extension being situated in parallel to each other and to the main extension plane, the first protrusion and the second protrusion being situated one of offset next to each other or at least partially overlapping each other, along a projection direction which is perpendicular to the main extension plane.

6. The rotation rate sensor as recited in claim 1, wherein at least one of:
   (a) in the rest position, the first protrusion is surrounded by the second oscillating mass along a circumferential line extending in parallel to the main extension plane; and
   (b) in the rest position, the second protrusion is surrounded by the first oscillating mass along a further circumferential line extending in parallel to the main extension plane.

7. The rotation rate sensor as recited in claim 1, wherein at least one of the first recess has a further first main direction of extension and the second recess has a further second main direction of extension, and wherein at least one of (i) in the rest position, the first main direction of extension of the first protrusion and the further second main direction of extension of the second recess being situated in parallel to each other, and (ii) in the rest position, the second main direction of extension of the second protrusion and the further first main direction of extension of the first recess being situated in parallel to each other.

8. The rotation rate sensor as recited in claim 1, wherein at least one of:
   (i) the first protrusion of the first oscillating mass includes a first additional mass, at least one of the first additional mass and the first recess being situated along the first main direction of extension at opposing ends of the first protrusion; and
   (ii) the first oscillating mass including a further first additional mass, the further first additional mass surrounding the first recess in a C-shaped manner.

9. The rotation rate sensor as recited in claim 8, wherein: the second protrusion of the second oscillating mass includes a second additional mass and a further second additional mass; and
   (i) at least one of the first additional mass and the further first additional mass of the first oscillating mass and (ii) at least one of the second additional mass and the further second additional mass of the second oscillating mass being situated on mutually facing sides of the first and second oscillating masses.

10. A method for operating a rotation rate sensor having a substrate, a first oscillating mass, and a second oscillating mass mechanically coupled to the first oscillating mass, the rotation rate sensor being configured to detect a rotation rate about a rotational axis which is essentially parallel to a main extension plane of the substrate, comprising:

performing the following in a first method step: deflecting the first oscillating mass along the first oscillations plane, and deflecting the second oscillating mass along the second oscillations plane; and performing the following in a second method step: deflecting the first oscillating mass out of the first oscillations plane into the first deflection position, and deflecting the second oscillating mass out of the second oscillations plane into the second deflection position;

wherein during the second method step, one of:

(a) at least one of (i) a first protrusion of the first oscillating mass is moved out of a recess of the second oscillating mass during a transition from a rest position into the first deflection position, and (ii) a second protrusion of the second oscillating mass is moved out of a recess of the first oscillating mass during a transition from a rest position into the second deflection position; or (b) at least one of (iii) the first protrusion of the first oscillating mass is moved through the second recess during the transition from the rest position into the first deflection position, and (iv) the second protrusion is moved through the first recess during the transition from the rest position into the second deflection position.

* * * * *